W. MESCHKAT.
PROPELLING MECHANISM FOR BICYCLES.
APPLICATION FILED JAN. 22, 1913.
1,073,696.
Patented Sept. 23, 1913.
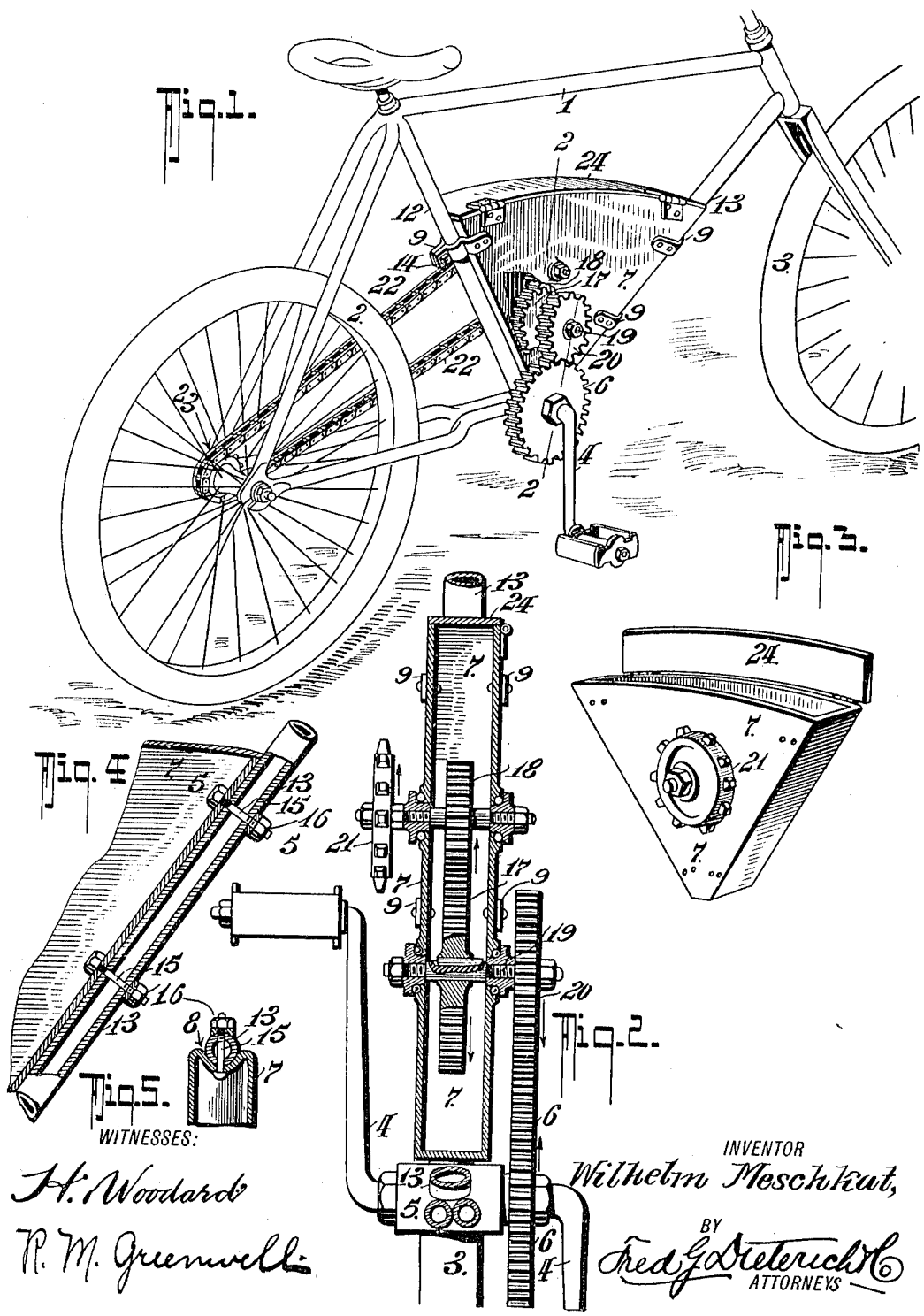

UNITED STATES PATENT OFFICE.

WILHELM MESCHKAT, OF HOUSTON, TEXAS.

PROPELLING MECHANISM FOR BICYCLES.

1,073,696.  Specification of Letters Patent.  Patented Sept. 23, 1913.

Application filed January 22, 1913. Serial No. 743,575.

*To all whom it may concern:*

Be it known that I, WILHELM MESCHKAT, residing at Houston, in the county of Harris and State of Texas, have invented certain new and useful Improvements in Propelling Mechanism for Bicycles, of which the following is a specification.

My invention has for its purpose to provide an improved arrangement of gearing, and means for supporting the same, including clamping devices whereby the said gearing and its supporting means may be readily applied to any of the ordinary types of bicycle frames.

The main object of my invention is to provide an improved high speed mechanism for bicycles of a simple and inexpensive construction, that can be readily applied to the common types of bicycle frames, and thereby furnish a substantial and inexpensive substitute for the expensive motor cycle.

With other objects in view that will hereinafter appear, my invention consists in the attachment for bicycles that embodies the peculiar construction and novel arrangement of parts hereinafter fully explained, specifically pointed out in the appended claims and illustrated in the accompanying drawing, in which:—

Figure 1 is a perspective view of a bicycle frame equipped with my improved high speed drive gearing attachment. Fig. 2 is a section on line 2—2 on Fig. 1. Fig. 3 is a perspective view of the casing, and Fig. 4 is a detail view of a modified means for clamping the supporting frame or casing onto the bicycle frame. Fig. 5 is a section on the line 5—5 of Fig. 4.

In the drawing 1 designates the common type of bicycle frame, 2 the rear or driven wheel, 3 the steering wheel, and 4 the crank axle journaled in the usual boxing 5 at the lower or apex end of the frame 1, and which carries, in place of a chain gear, a spur gear 6 the periphery of which moves in a plane above the lower or crotch end of the frame 1.

7 designates a triangular shaped supporting casing, shaped to fit down into the lower or crotch portion of the bicycle frame 1, its front and rear edges being concaved as at 8 to snugly seat against the bars 12—13 of frame 1.

The body or supporting casing 7 is formed of thin sheet steel and at intervals the concaved ends have integral pairs of opposing extensions 9 that form spring clamps, since they are shaped to spring or snap over the bicycle frame bars 12 and 13.

Each of the extensions are apertured and the said extensions are relatively of such shape that they form opposing members for receiving the clamping or drawing up screws and nuts 14, the tightening of which clamps the extensions 9 secure on the bars 12 and 13 and thereby rigidly hold the supporting member or casing 7 on the bicycle frame.

Instead of forming the casing 7 with spring clamps 9 or extensions as stated, the concaved edges of the housing may have suitably spaced bolts 15 for passing through apertures drilled through the bars 12 and 13, the ends of the studs being threaded to receive the clamp nuts 16 as shown in Figs. 4 and 5.

Within the casing 7 are mounted speed increasing gears 17 and 18 that mesh with each other. I have shown but two of such gears, but wish it understood a greater number may be properly mounted and held in mesh within the casing for transmitting from the normally low speed of the crank gear a high speed to the shaft that carries the uppermost or smallest diameter gear 18. The shaft 19 of the other speed increasing gear 17 projects through the casing and carries a gear 20 that meshes directly with the crank gear at one side of the casing, and the shaft that carries the gear 18 projects through the casing at the other side and carries a chain wheel 21 over which takes the drive chain 22 that passes over the chain wheel 23 fixed on the axle of the rear or driven wheel and located in alinement with the chain wheel 21.

By connecting up the chain wheels at one side of the casing and the speed developing gears with the crank shaft at the other side of the casing, the strain on the machine and particularly on the casing 7 is the more evenly balanced and the desired action of the gearing is rendered the more effective. Mounting the main gears in the casing keeps the same free of dust and dirt.

With my attachment an ordinary bicycle frame can be readily and economically equipped to run from fifty to sixty miles an hour with the normal pedal motions, as one turn of the pedals can be easily developed into six to eight turns of the rear or driven wheel.

The upper end of the casing is closed by a removable cap or cover 24, and by reason thereof the gears 17 and 18 can be readily dropped into the casing and their shafts inserted through the casing and the gears, after which the casing top is made secure.

From the foregoing taken in connection with the drawing the complete construction, the manner of its application and the advantages of my invention will be readily understood.

What I claim is:

1. An attachment for bicycles, comprising a hollow casing having means for attaching it in the crotch or crank bearing end of a bicycle frame; said casing having shaft bearings in its opposite sides, cross shafts for engaging the said bearings, transmission gears mounted in the casing and adapted to receive their respective cross shafts insertible through and journaled in the bearings in the opposite side of the casing, one of the shafts carrying a gear for meshing with the crank axle gear of the bicycle, and another of the said shafts carrying a transmission gear to receive a driving chain coupled with the bicycle driving wheel.

2. A high speed gearing attachment for bicycles that comprises in combination with the crank axle gear, and the driving wheel axle gear; an open top casing shaped to seat in the crotch crank axle bearing end of a bicycle frame, said casing having means for fixedly attaching it to the said bicycle frame, the said casing having opposing sets of shaft bearings, transmission gears insertible into the top of the casing, shafts for the gears, insertible through the bearings in the casing sides and through their corresponding gears, the lowermost shaft being provided with a gear for meshing with the said crank axle gear, the uppermost one of the shafts having an end extended from the opposite side of the casing, a drive sprocket on the said extended end and a chain connecting the said drive sprocket and the driving wheel axle gear.

3. As an improvement in bicycles, the combination with the bicycle frame, the rear or driven wheel having a sprocket gear at one side, the crank axle, said axle having a gear at the side opposite the rear axle gear, an open top hollow casing shaped to fit the crotch or crank bearing end of the bicycle frame, said casing having its edges shaped to seat around the frame bars with which they engage, the said edges having means for interlockably engaging the said bars, the said casing also having a series of bearing apertures on its opposite sides arranged in opposing pairs, speed accumulating gears insertible through the top of the casing and held to intermesh, shafts insertible through the bearings in the casing and through their respective gears, to turn with the gears, the lowermost shaft being extended over the crank axle gear and having a gear that meshes with the said crank axle gear, the uppermost one of the shafts having a sprocket wheel and a chain for connecting the sprocket wheel and the gear on the rear wheel axle.

WILHELM MESCHKAT.

Witnesses:
DAN H. TRIPLETT,
ALFRED WALTER MESCHKAT.

---

Copies of this patent may be obtained for five cents each, by addressing the "Commissioner of Patents, Washington, D. C."